June 30, 1970 P. H. CONWAY 3,517,879

DIGITAL SIGNAL CROSS-CORRELATOR

Filed Jan. 3, 1967 2 Sheets-Sheet 1

INVENTOR
PATRICK H. CONWAY

BY Thomas J. Nikolai
ATTORNEY

June 30, 1970 P. H. CONWAY 3,517,879

DIGITAL SIGNAL CROSS-CORRELATOR

Filed Jan. 3, 1967 2 Sheets-Sheet 2

INVENTOR
PATRICK H. CONWAY

BY Thomas J. Nikolai
ATTORNEY 3,517,879

DIGITAL SIGNAL CROSS-CORRELATOR

Patrick H. Conway, Minneapolis, Minn., assignor to Sperry Rand Corporation, New York, N.Y., a corporation of Delaware Filed Jan. 3, 1967, Ser. No. 606,904
Int. Cl. G06f *15/34*
U.S. Cl. 235—181 4 Claims

ABSTRACT OF THE DISCLOSURE

A digital signal cross-correlator for split-phase pulse code modulation (PCM) signals that multiplies a reference signal times a digital signal and integrates the result of the multiplication. Further, the output of the integrator is compared with a fixed potential to produce a signal that is coupled to a dump control circuit which couples a positive or negative voltage to the input of the integrator at the proper time in order to drive the output of the integrator to a fixed value representing the desired dumped condition of the integrator.

BACKGROUND OF THE INVENTION

This invention relates to cross-correlators and in particular to a digital signal cross-correlator for split phase PCM signals. Cross-correlation is an optimum method of extracting information from noisy signals and is equivalent to detection with a matched-filter. However, matched-filters are usually difficult or impossible to physically realize while cross-correlators are relatively simple to mechanize and they have performance nearly equal to that theoretically derived.

Mathematically, cross-correlation involves multiplying the input signal by a reference signal which is a replica of the input signal and integrating the product. When the reference signal and the input signal are in phase, a maximum correlation results as indicated by a maximum at the integrator output.

While the mechanization of a cross-correlator may be relatively simple, the design of a multiplier for arbitrarily defined signals and wideband operation may be a complicated problem. However, in the present invention, a simple circuit for multiplication of binary signals is provided.

SUMMARY OF THE INVENTION

The invention relates to a cross-correlator in which a split-phase PCM input signal and an inverted version of this input signal are alternately connected to an integrator by a pair of field effect transistor switches controlled by a reference waveform and whose output can be dumped to any desired value by comparing the output with a voltage representing the desired value and adding or subtracting voltage to the input of the integrator whereby compensation is provided for any offset bias which may exist.

Thus, it is an object of the present invention to provide a digital cross-correlator in which the input signal and inverted input signal are alternately connected to an integrator by a pair of field effect transistors controlled by a reference waveform.

It is another object of the present invention to provide an integrator whose output can be dumped to any desired value by comparing the output with the desired value and adding or subtracting voltage to the input of the integrator.

BRIEF DESCRIPTION OF THE DRAWINGS

These and other more detailed and specific objects will be disclosed in the course of the following specification, reference being had to the accompanying drawings, in which.

DESCRIPTION OF THE PREFERRED EMBODIMENTS

The description of operation of the digital signal cross-correlator will be based on the detection of serial PCM (pulse code modulation) split-phase signals, one bit at a time. General cross-correlator operation for other code forms and over $n$ bit-times is described in applicant's commonly assigned copending application entitled "Conditioner and Bit Synchronizer," Ser. No. 606,882, filed Jan. 3, 1967 now abandoned.

A binary signal conveys information through the use of only two levels which may be defined as $+1$ and $-1$. Other definitions of binary signals exist which, in most cases, are equivalent to the above. It should be pointed out however that the techniques described herein may also be applicable to digital signals of more than two levels by application of proper reference and timing waveforms, especially ternary (3-level) signals which have levels defined as $+1$, 0 and $-1$.

Figure 1:
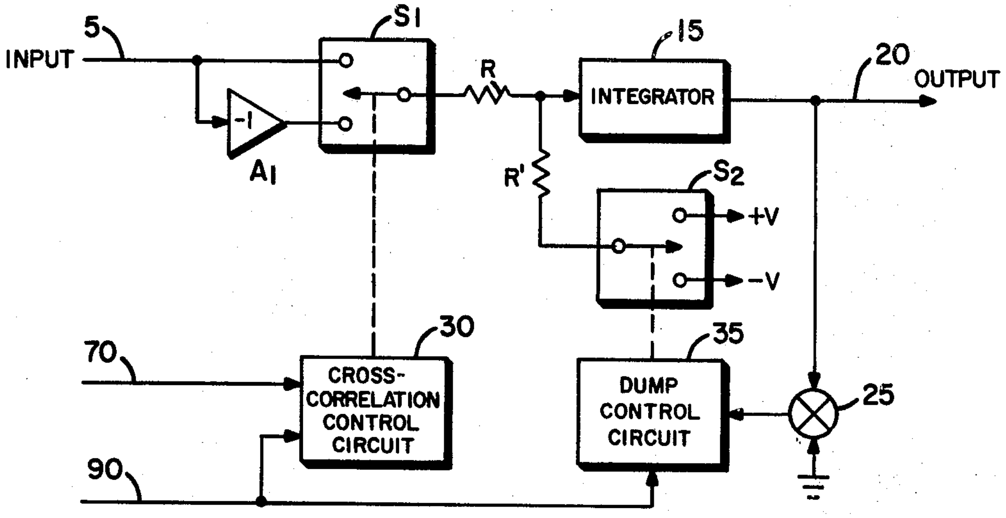
FIG. 1 is a general block diagram of the present invention.

A general block diagram of the present invention is shown in FIG. 1. A split-phase signal is applied via input line 5 to one terminal of switch $S_1$ and to linear unity gain inverting amplifier $A_1$ which produces an output that is coupled to the other terminal of switch $S_1$. The reference signal is applied to cross-correlation control circuit 30 (via line 70) which controls switch $S_1$ to cause the input signal and the inverted input signal to be alternately connected through resistor R to integrator 15. The alternate connection of the input signal and the inverted input signal to the integrator 15, produces the bit-by-bit product of the signal and the reference waveform at the input to integrator 15. The output of integrator 15 on line 20 is the integral of the product of the input and reference waveforms. This output is connected to comparator 25 which compares the output with a fixed reference potential such as ground potential as shown in FIG. 1. The output of the comparator is dependent upon the difference between the integrator output and the fixed reference potential and is coupled to dump control circuit 35. Whenever a dump control signal is present on line 90, cross-correlation control circuit 30 is disabled thus preventing any input to the integrator from switch $S_1$ while dump control circuit 35 is enabled. Dump control circuit 35, when enabled, acts under the influence of the signal from comparator 25 to control switch $S_2$ such that either a positive or a negative voltage is coupled to the input of integrator 15 via resistor R′ whereby the output of integrator 15 is caused to be driven in the direction of the fixed reference potential until there is a null at the output of comparator 25.

Figure 2:
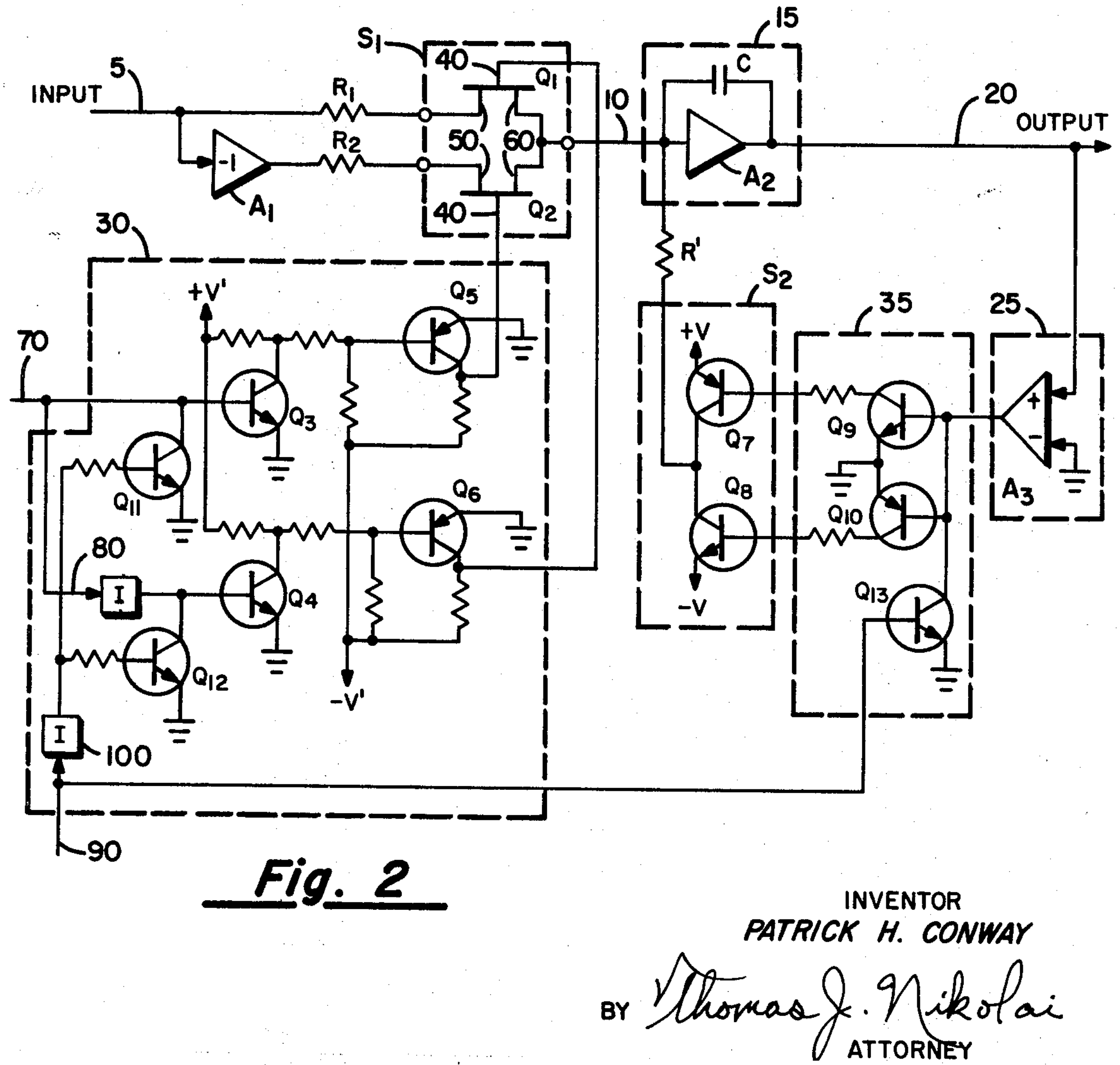
FIG. 2 is a detailed wiring diagram of the present invention.
Figure 3:
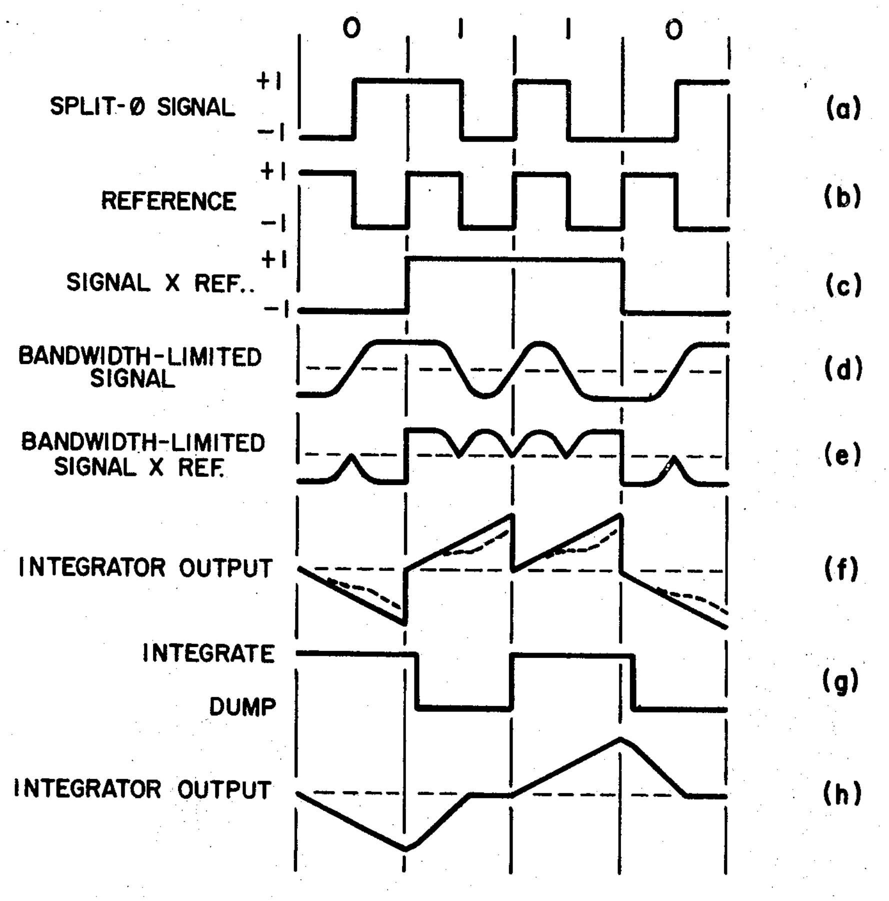
FIG. 3 is a representation of the waveforms found at various locations in the circuit shown in FIG. 2.

A detailed wiring diagram of the present invention is shown in FIG. 2. The split-phase signal is applied to input line 5. This split-phase signal may represent a digit value of "0" by a first potential level, i.e. for example, $-1$, for the first one-half bit-time and a second potential level, i.e. for example, $+1$, the second half bit-time. A digit value of "1" may be represented by reversing the potentials. This waveform is illustrated in FIG. 3 as waveform (*a*). This split-phase signal is applied to one terminal of switch $S_1$ through resistor $R_1$ and to the other terminal of switch $S_1$ through linear unity gain inverting amplifier $A_1$ and resistor $R_2$. Switch $S_1$ consists of two field effect transistors (FET) $Q_1$ and $Q_2$, each of which has a gate terminal 40, a drain terminal 50 and a source terminal 60. The source terminal 60 of each FET is coupled to the input of integrator 15 via line 10. As stated previously, the operation of the FET transistors in switch $S_1$ is controlled by cross-correlation control circuit 30. For purposes of example only, the reference waveform which is applied to the cross-correlation control circuit 30 via line 70 is a +1 the first one-half bit-time and a −1 the second one-half bit-time as illustrated by waveform (*b*) in FIG. 3. Of course, reverse polarities could be used.

It is desired to obtain an input to integrator 15 that is the product of the split-phase input signal and the reference waveform. The product of waveforms (*a*) and (*b*) is shown in waveform (*c*). The criteria for determining the value of the product can be determined by comparing waveforms (*a*) and (*b*) and will be seen to be: $+1 \times +1 = +1$, $-1 \times -1 = +1$, $+1 \times -1 = -1$, and $-1 \times +1 = -1$. Thus the reference waveform that is applied to cross-correlation control circuit 30 on line 70 must cause FET $Q_1$ to be ON and FET $Q_2$ to be OFF during the first one-half bit-time and FET $Q_2$ to be ON and FET $Q_1$ to be OFF during the second one-half bit-time. Thus, the signal which is applied to the input of the integrator 15 on line 10 during the first one-half bit-time is the input split-phase signal through FET $Q_1$ and during the second one-half bit-time, the inverted split-phase signal through FET $Q_2$ is applied to the input of the integrator 15.

Operation of FET's $Q_1$ and $Q_2$ in switch $S_1$ is accomplished with control circuit 30. The input to integrator 15 on line 10 to which the sources 60 of the FET's are connected is always near ground potential. If the gate terminal 40 of $Q_1$ or $Q_2$ is at ground potential, nearly zero volts bias is applied to the FET and it will be ON with a low resistance appearing between the drain terminal 50 and the source terminal 60. If a large potential (negative for *n*-channel FET's as shown but positive for *p*-channel FET's) is applied to the gate terminal 40, the FET will be OFF and a very large value of resistance appears between the drain terminal 50 and the source terminal 60.

If either transistor $Q_5$ or $Q_6$ in control circuit 30 is OFF, the gate terminal 40 of the associated FET in switch $S_1$ is coupled to the $-V'$ buss and the FET is, therefore, turned OFF. If transistor $Q_5$ or $Q_6$ is ON, the gate terminal 40 of the associated FET in switch $S_1$ is at ground potential and the FET is, therefore, turned ON.

Transistors $Q_5$ and $Q_6$ are controlled by transistors $Q_3$ and $Q_4$ respectively. Thus, if either transistor $Q_3$ or $Q_4$ is OFF, the base of the associated transistor $Q_5$ or $Q_6$ respectively is at a positive potential and the associated transistor is therefore OFF. If transistor $Q_3$ or $Q_4$ is ON, a negative potential appears at the base of transistor $Q_5$ or $Q_6$ respectively which turns it ON.

Thus, when the cross-correlation reference waveform on line 70 is in the "1" state (+1), transistors $Q_3$ and $Q_5$ and FET $Q_1$ are all ON and, due to the inverter in line 80 to the base of transistor $Q_4$, transistors $Q_4$ and $Q_6$ and FET $Q_2$ are all OFF. Therefore, the positive input signal on line 5 is coupled to the input of integrator 15 via FET $Q_1$. It is obvious that when the cross-correlation reference waveform on line 70 is in the "0" state (−1), the opposite is true, i.e. transistors $Q_3$ and $Q_5$ and FET $Q_1$ are all OFF and, due to the inverter in line 80, transistors $Q_4$ and $Q_6$ and FET $Q_2$ are all ON and thus the negative signal from inverting amplifier $A_1$ is coupled to the input of integrator 15 via FET $Q_2$. It will be seen then that the reference waveform applied to control circuit 30 controls switch $S_1$ so as to cause the split-phase input signal and the inverted split-phase signal to be alternately connected to the input of integrator 15 via line 10. As stated previously, this in effect applies the product of the input signal and the reference signal to the input of integrator 15 as shown by waveforms (*a*), (*b*) and (*c*) in FIG. 3.

In practice, the signal input is bandwidth limited. Such a bandwidth limited signal is illustrated in waveform (*d*) in FIG. 3 for the same data as shown in waveform (*a*). In the process of bandwidth limiting, delay is inherent and such delay is neglected in waveform (*d*). However, the principle of the operation is the same without such delay shown. Thus, the product of the reference and the bandwidth limited signal is present on line 10 as shown by waveform (*e*). It will be appreciated that for bandwidth limited signals, the correlation coefficient obtained is approximate since the reference is no longer an exact replica of the input signal.

To produce maximum correlations, the reference and the input signal must be synchronized. A possible method of obtaining such synchronization is described in applicants' above mentioned copending application.

The ideal output of the integrator 15 on line 20 for the data indicated in waveform (*a*) is illustrated in waveform (*f*) by the solid line while the output for the bandwidth-limited signal of waveform (*d*) is shown by the dotted lines.

At the end of each bit-time, the integrator is dumped, i.e., the output on line 20 is driven to zero. If the output of the integrator at the end of the bit period (prior to dumping) is positive, the data for the bit-time is construed to be a "1" and, if negative, it is construed to be a "0". Integrator 15 is conventional and includes amplifier $A_2$ and capacitor C connected in parallel.

If noise is present at the input to the cross-correlator and if the integral of the product of the noise and the reference exceeds the integral of the product of the signal and the reference and is of the opposite polarity, an error in detection results. This is true since an integrator is a mathematically linear device to which the principle of superposition applies. Thus, the output due to a signal with noise is the sum of the outputs for the signal alone and the noise alone. Probability of error in detection versus signal-to-noise is derived in the literature and performance very nearly approaching the theoretical limit is obtained by the present invention.

In practice, integrator 15 cannot be dumped instantaneously as indicated in waveform (*f*). To provide integration over a full bit-time without allocating a portion of the time for dumping, interlaced integrators may be used as described in the above mentioned copending application.

The integrate-dump waveform which is applied to line 90 in FIG. 2 is shown as waveform (*g*) in FIG. 3. The integration period may be extended slightly beyond the end of the bit-time as indicated in waveform (*g*) so as to permit sampling the integrator output at the end of the bit-time without affecting the value of the sample by the dump circuit. The interlaced integrator operating at alternate bit-times to those indicated in waveform (*g*) would require a control waveform as shown in waveform (*g*) displaced one bit-time.

Dumping is achieved by applying a signal to the input of the integrator to cause it to integrate to a predetermined reference potential such as ground rather than by the more obvious method of directly discharging the capacitor C. Thus, compensation for DC drifts and offsets in the integrator are automatically achieved.

The output of the integrator 15 on line 20 is applied to an input of amplifier $A_3$ in comparator 25. Amplifier $A_3$ is a high input impedance, high gain differential amplifier. The reference potential is applied to the other input of amplifier $A_3$. In general, it is not important whether the signal or the reference potential be applied to the inverting or the non-inverting input. The voltage to which the integrator is dumped can be varied by applying a reference voltage of some value other than ground to the other input of the differential amplifier $A_3$. A voltage (not shown) can also be applied at the reference input to compensate for the offset voltage of the differential amplifier $A_3$.

Thus, differential amplifier $A_3$ acts as a comparator. Its output is positive for positive outputs of the integrator 15, thus representing a "1" and is negative for negative outputs of the integrator 15, thus representing a "0." When the output of amplifier $A_3$ is positive, transistor $Q_9$ is ON and $Q_{10}$ is OFF (neglecting transistor $Q_{13}$ for the moment). The collector current of transistor $Q_9$ flows in the base of $Q_7$ turning it ON and applying +V to resistor R′. Transistor $Q_8$ is OFF at this time. For a negative output from amplifier $A_3$, transistors $Q_9$ and $Q_7$ are OFF, $Q_{10}$ and $Q_8$ are ON and −V volts is applied to resistor R′. Thus, transistors $Q_7$ and $Q_8$ represent switch $S_2$ in FIG. 1 that is controlled by dump control circuit 35 which consists of transistors $Q_9$ and $Q_{10}$ connected as shown.

Thus, if the integrator output is positive on line 20, transistors $Q_9$ and $Q_7$ are ON and +V is applied to R′. Due to inversion in amplifier $A_2$, the output of the integrator on line 20 is driven in a negative direction to cause the positive output on line 20 to go to zero (or to the reference potential applied to differential amplifier 25). For a negative integrator output, transistors $Q_{10}$ and $Q_8$ are ON, −V is applied to resistor R′ by switch $S_2$ and the integrator output on line 20 is driven in a positive direction to cancel the negative voltage present thereon. The integrator output on line 20 for the data shown in waveform (*a*) and for interlaced operation as indicated in waveform (*g*) is shown in waveform (*h*).

When a "1" is present on the integrate-dump line 90, transistor $Q_{13}$ is turned ON and transistors $Q_9$ and $Q_{10}$ are turned OFF since their bases are grounded. Transistors $Q_7$ and $Q_8$ are also OFF and no dump signal is applied to the integrator. Due to the inverter 100 in the lead to the bases of transistors $Q_{11}$ and $Q_{12}$, they are OFF when a "1" is present on the integrate-dump line and the FET control circuits 30 cause FET's $Q_1$ and $Q_2$ to turn OFF and ON according to the reference waveform as explained previously.

When a "0" is present on the integrate-dump line 90, transistors $Q_{11}$ and $Q_{12}$ are ON thus disabling the FET control circuit 30 and causing both transistors $Q_1$ and $Q_2$ to be OFF. Thus, the signal input is disconnected from the integrator input. Transistor $Q_{13}$ is then OFF which permits a positive or a negative voltage to be applied to resistor R′ from switch $S_2$ according to the polarity of the integrator output as determined by comparator 25 and dump control circuit 35.

The values of resistor R′, and voltages +V and −V must be such that the integrator can reach the reference potential in less than one bit-time from the maximum value permitted by the value of R and the signal amplitude during one bit-time interval.

A bistable device such as a Schmitt trigger may be placed in the comparator output circuit to prevent both transistors $Q_7$ and $Q_8$ from turning ON when the integrator output is near zero volts during the dump cycle. If necessary, separate resistors R′ may be connected from the collectors of transistors $Q_7$ and $Q_8$ to the input of amplifier $A_2$ to prevent excessive heat dissipation in transistors $Q_7$ and $Q_8$ if they were both to be turned ON simultaneously.

Transistors $Q_{11}$ and $Q_{12}$ could be eliminated. If this is the case, however, the input signal would always be applied to the integrator and the additional requirement to those stated above for the dump circuit that dumping must be achieved in the presence of the maximum opposing input is imposed.

I claim:

1. A digital cross-correlator comprising:
   (a) first and second field effect transistors each having an input terminal for receiving a split-phase input signal and an inverted version of said input signal respectively, an output terminal and a gate terminal;
   (b) third and fourth transistors each having an input and an output terminal;
   (c) means coupling a reference signal to the input terminal of said third transistor and an inverted version of said reference signal to the input terminal of said fourth transistor whereby said third and fourth transistors alternately conduct and produce an output control signal;
   (d) means connecting said output control signal to said gate terminal of said first and second transistors for causing alternate conduction thereof;
   (e) integrator means coupled to the output terminal of said first and second transistors;
   (f) fifth and sixth complementary symmetry transistors, each having an input terminal for receiving a positive and a negative voltage, respectively, an output terminal connected to the input of said integrator means, and a control terminal for receiving a gating control signal;
   (g) comparator means connected to receive as a first input the output from said integrator means and as a second input a predetermined reference potential to produce at its output said positive and negative voltages when a difference exists between said integrator output and said reference potential; and
   (h) a dump control circuit coupled to said control terminal of said fifth and sixth transistors and to the output of said comparator means, whereby said positive and negative voltages are coupled to the input of said integrator depending upon the polarity of said output from said comparator.

2. A digital cross-correlator as in claim 1 wherein said comparator comprises:
   (a) a differential amplifier having a first input for receiving the output of said integrator, a second input for receiving said reference potential and an output terminal coupled to said control circuit for said voltage switch.

3. A digital cross-correlator as in claim 1 wherein said dump control circuit comprises:
   (a) seventh and eighth opposite polarity transistors each having an input terminal connected to the output of said comparator and an output terminal coupled to the input terminal of a respective one of said fifth and sixth transistors in said voltage switch for providing each gating control signal whereby one of said fifth and sixth transistors is caused to conduct depending upon the polarity of the comparator output signal.

4. A digital cross-correlator as in claim 1 further including:
   (a) means coupled to said dump control circuit and to said cross-correlation control circuit whereby when one of said control circuits is enabled the other is disabled.

References Cited

UNITED STATES PATENTS

| | | | |
|---|---|---|---|
| 2,891,725 | 6/1959 | Blumenthal et al. | 235—183 |
| 3,331,955 | 7/1967 | Norsworthy | 235—181 |

OTHER REFERENCES

Gulbenk et al. How modules make design simple from: Electronics, Dec. 28, 1964, pp. 50–54 (note p. 53) analog building blocks.

EUGENE G. BOTZ, Primary Examiner

F. D. GRUBER, Assistant Examiner

U.S. Cl. X.R.

235—150.5, 150.53, 156; 307—205, 229